March 30, 1954 — H. W. PETRIE — 2,673,586
ANTISKID CHAIN MEANS FOR VEHICLE WHEELS
Filed Feb. 21, 1952 — 2 Sheets-Sheet 1

INVENTOR.
Harold W. Petrie
BY
Attorney

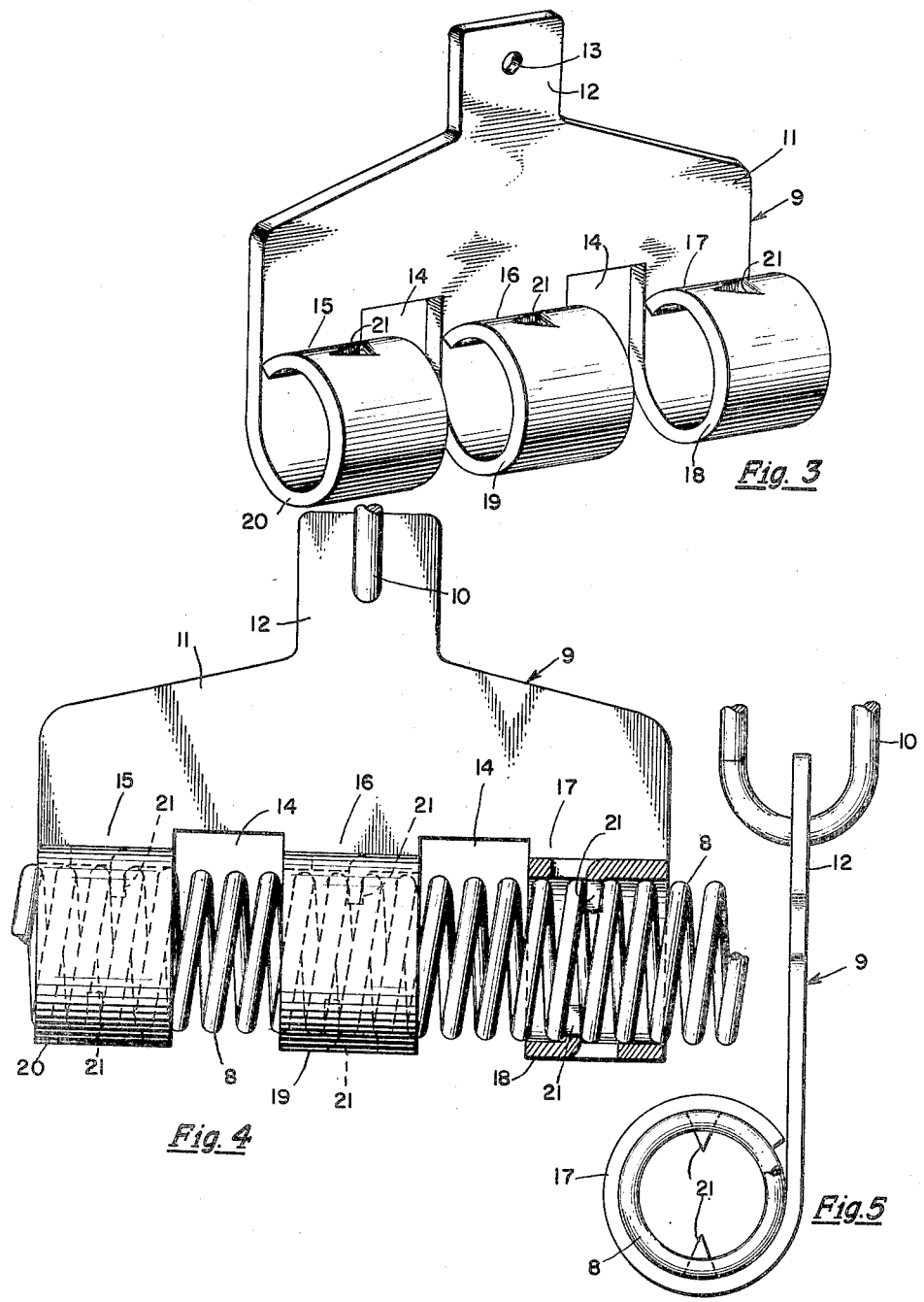

Patented Mar. 30, 1954

2,673,586

UNITED STATES PATENT OFFICE 2,673,586

ANTISKID CHAIN MEANS FOR VEHICLE WHEELS

Harold W. Petrie, Lemont, Ill.

Application February 21, 1952, Serial No. 272,848

2 Claims. (Cl. 152—219)

My invention relates to improvements in antiskid chain devices for vehicle wheels.

An important object of my invention is to provide an article or device of the aforementioned character, which is equipped with endless resilient means of circular formation having adapter clip means interconnecting the said endless resilient means to cross skid chain means.

Another object of my invention is to provide a device of the aforementioned character, which may be readily slipped over a vehicle wheel tire, and readily removed therefrom.

A still further object of my invention is to provide a device of the aforementioned character, which is completely closed at all times, the same having no openings or tightening latches as is the conventional practice with anti-skid chain constructions.

A still further object of my invention is to provide in a device of the aforementioned character, adapter clip means having lug means for connection to anti-skid chain means, and further provided with a multiple number of coiled portions enveloping the endless spring or resilient means.

A still further object of my invention is to provide toothed or indentation means in the said adapter clip means which will enter the spaces between coils of the resilient means, thereby confining the clip means against circumferential movement about the said resilient or spring means.

A still further object of my invention is to provide a device of the aforementioned character in which the skid-chain means are held tautly enveloping the circumferential portion of a vehicle wheel tire, preventing progressive "creep," with respect to the tire, and preventing "back-slap" and noises which are usually attendant upon loosely fitted anti-skid chain constructions.

A still further object of my invention is to provide a device of the aforementioned character which is simple in construction, practical in its function and operation, readily attachable to, and removable from, vehicle wheel tires, as well as a device of such simple construction as to lend itself ideally to economical manufacture in quantity production.

Other features, objects and advantages resident in my invention will become apparent from an examination of the accompanying drawings, having reference to the ensuing description for a clear exposition thereof; the various views being designated by figure numbers, the identical elements illustrated being designated by like numerals, and in which:

Fig. 3 is a perspective view of one of the adapter clip means utilized in connecting the cross chain members, components of my invention.

Fig. 4 is a front view of Fig. 3.

Fig. 5 is an end view of Fig. 4.

Figure 1:
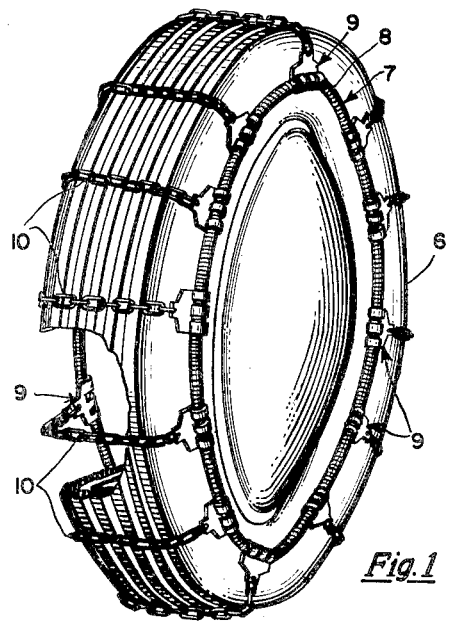
Fig. 1 is a perspective view of a vehicle wheel with my invention attached thereto, having a certain portion thereof broken away in order to more clearly depict and elucidate the structural details of my invention.
Figure 2:
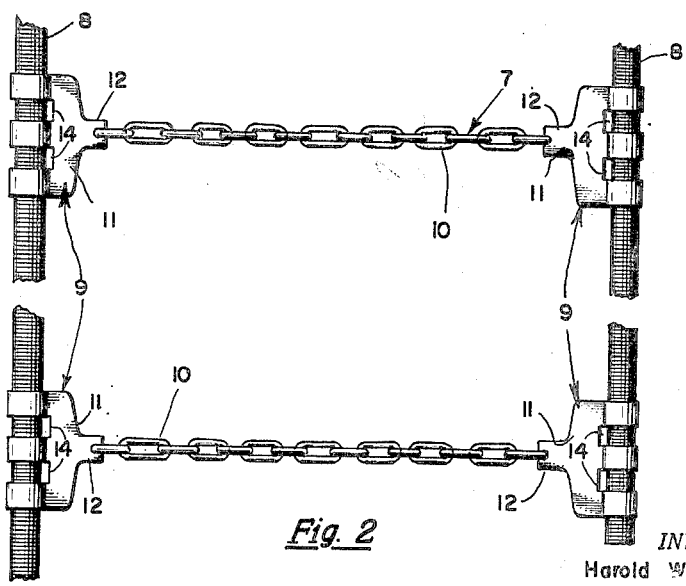
Figure 2 is an enlarged fragmentary view of a sectional portion of my invention illustrated in Fig. 1.

Referring to the various views, my invention is generally designated 7, and is shown mounted on a tire generally designated 6, the tire being in an inflated condition.

The detailed structure of my invention consists of a pair of endless spring elements 8 of circular formation adapted to stretch tautly to be positioned in intimate contact with the sides of each face of the tire, straddling the same by virtue of the cross connecting anti-skid chain elements 10 which are secured to both of the spring elements 8 by virtue of the adapter element generally designated 9.

The said adapter element consists of a body portion 11, having an upwardly extending lug 12 in which a suitable bore 13 is formed.

It is the province of the said bore to secure one end link of the chain element 10. The body 11 extends downwardly and is provided with two slotted openings 14 so as to provide the attaching portions 15, 16 and 17, which are coiled about to a circular formation to form the securing portions or tubularly shaped holding portions 18, 19 and 20 which are substantially of tubular formation to envelop a section of the spring element 8.

It will be noted that a multiple number of the adapter clip means 9 are provided and spaced equidistantly and circumferentially about the spring elements 8.

The same are maintained in their spaced relationship by means of toothed indentations 21, which are formed at the circumferential portions of the tubular portions 18, 19 and 20.

One or more toothed indentations 21 may be provided for entering the spaces between the closely wound spring tensioning elements 8. The said toothed means 21 therefore furnishes rigid security with respect to the spring element 8, and confines the element 9 against circumferential movement or displacement, maintaining the anti-skid chain elements 10 always in equidistantly spaced relationship about the circumference of the vehicle wheel tire 6.

The tensioning action of the spring element 8 on either side, tends to draw the skid-chain element 10 tightly over the tire, so as to prevent movement thereof with respect to the tire and to prevent "back-slap" and noises, as well as damage resulting to the tire from the anti-skid chain element 10, conventionally used with anti-skid chain constructions.

It is also to be noted that the anti-skid construction 7 can be readily assembled or removed from a tire 6 by means of the stretching properties of the spring element 7. In other words, the spring element to occupy the inner side of the wheel 6 is stretched over the outer periphery of the vehicle wheel tire 6 and allowed to drop into place by its normal contraction.

The two spring elements 8 thus confine the anti-skid chain means 7 over the vehicle wheel tire preventing progressive movement thereof, with respect to the tire, in other words, once it is placed on the vehicle wheel tire it will remain fixedly and firmly in that position.

The operation of the device is efficient in providing added traction and at the same time is noiseless and simple to attach to vehicle wheel tires; furthermore the anti-skid chain means will not be subjected to "creep."

I believe I have herein illustrated and described the nature of my invention, and expounded, in expository form, the teachings so that those familiar with the art will be able to practice my invention. Inasmuch as the same is susceptible of many modifications, alterations, and improvements, I hereby reserve the right to any improvements, alterations and modifications coming within the scope and spirit of my invention and disclosure, also the right to any improvements impliably embraced in the accompanying illustrations depicting the generally suggested elemental structure of my invention, and also any modifications, improvements, or alterations, falling within the purview of the foregoing description; my invention to be limited only by the subjoined claims.

Having thus disclosed and revealed my invention, what I claim as new and desire to secure by Letters Patent is:

1. Anti-skid means for vehicle tires, comprising a pair of endless tensioned coil spring elements, a multiplicity of cross anti-skid chain elements, adapter clip elements securing the said spring elements to the said cross anti-skid chain elements, the said adapter clip elements being provided with a plurality of tubularly-formed spring attaching portions secured to the said spring elements, and toothed portions on the said spring attaching portions engaging spaces between coils of the said spring elements to maintain the said adapter clip elements in equidistantly spaced relationship.

2. Anti-skid means for vehicle tires, comprising a pair of endless tensioned coil spring elements, a multiplicity of cross anti-skid chain elements, adapter clip elements securing the said spring elements to the said cross anti-skid chain elements, the said adapter clip elements being provided with lug portions having slotted portions for securing a link of the said cross anti-skid chain elements, the said adapter clip elements being provided with a plurality of tubularly-formed spring attaching portions secured to the said spring elements, and toothed portions on the said spring attaching portions engaging spaces between coils of the said spring elements to maintain the said adapter clip elements in equidistantly spaced relationship.

HAROLD W. PETRIE.

References Cited in the file of this patent
UNITED STATES PATENTS

| Number | Name | Date |
| --- | --- | --- |
| 1,213,949 | Reger | Jan. 30, 1917 |
| 1,295,669 | Addison | Feb. 25, 1919 |
| 1,335,165 | Hick | Mar. 30, 1920 |
| 1,435,551 | Peterson et al. | Nov. 14, 1922 |
| 1,578,803 | Comey | Mar. 30, 1926 |
| 1,786,229 | Conrow | Dec. 23, 1930 |
| 2,192,227 | Hill | Mar. 5, 1940 |
| 2,528,488 | Barszcz | Nov. 7, 1950 |